United States Patent
Bouchez et al.

(10) Patent No.: US 6,508,057 B1
(45) Date of Patent: Jan. 21, 2003

(54) PROCESS AND DEVICE INTENDED FOR NITROGEN OXIDES ELIMINATION IN AN EXHAUST LINE OF AN INTERNAL-COMBUSTION ENGINE

(75) Inventors: Mathias Bouchez, Meudon (FR); Gil Mabilon, Carrières sur Seine (FR); Brigitte Martin, Saint Genis Laval (FR); Patrick Bourges, Rueil-Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/457,260

(22) Filed: Dec. 9, 1999

(30) Foreign Application Priority Data

Dec. 9, 1998 (FR) .............................. 98 15639

(51) Int. Cl.[7] ................................. F01N 3/00
(52) U.S. Cl. ...................... 60/286; 60/295; 60/297; 60/301
(58) Field of Search ................. 60/285, 277, 276, 60/286, 295, 297

(56) References Cited

U.S. PATENT DOCUMENTS

| | | | | |
|---|---|---|---|---|
| 5,201,802 A | * | 4/1993 | Hirota et al. | 60/285 |
| 5,272,871 A | * | 12/1993 | Oshima et al. | 60/286 |
| 5,349,816 A | * | 9/1994 | Sanbayashi et al. | 60/277 |
| 5,388,406 A | * | 2/1995 | Takeshima et al. | 60/297 |
| 5,412,946 A | * | 5/1995 | Oshima et al. | 60/286 |
| 5,628,186 A | * | 5/1997 | Schmelz | 60/286 |
| 5,643,536 A | * | 7/1997 | Schmelz | 60/286 |
| 5,711,149 A | * | 1/1998 | Araki | 60/286 |
| 5,771,685 A | | 6/1998 | Hepburn | |
| 5,771,686 A | * | 6/1998 | Pischinger et al. | 60/285 |
| 5,788,936 A | * | 8/1998 | Subramanian et al. | 60/289 |
| 5,845,487 A | * | 12/1998 | Fraenkle et al. | 60/285 |
| 5,921,076 A | * | 7/1999 | Krutzsch et al. | 60/286 |
| 5,953,907 A | * | 9/1999 | Kato et al. | 60/285 |
| 5,992,141 A | * | 11/1999 | Berriman et al. | 60/286 |
| 5,996,338 A | * | 12/1999 | Hirota et al. | 60/285 |
| 6,021,639 A | * | 2/2000 | Abe et al. | 60/297 |
| 6,116,023 A | * | 9/2000 | Ishizuka et al. | 60/285 |
| 6,138,454 A | * | 10/2000 | Fournier et al. | 60/286 |

FOREIGN PATENT DOCUMENTS

| | | |
|---|---|---|
| DE | 4404617 | 8/1995 |
| EP | 814248 | 12/1997 |
| EP | 829623 | 3/1998 |
| EP | 922840 | 6/1999 |
| JP | 411153022 | * 6/1999 |

* cited by examiner

*Primary Examiner*—Thomas Denion
*Assistant Examiner*—Diem Tran
(74) *Attorney, Agent, or Firm*—Antonelli, Terry, Stout & Kraus, LLP

(57) ABSTRACT

A device for eliminating nitrogen oxides in an exhaust line of a lean-burn internal-combustion engine (1) a $NO_x$ trap (3) for trapping the nitrogen oxides, a system for regenerating the nitrogen oxides when the $NO_x$ trap is saturated, a hydrocarbon treating catalyst (2) placed upstream from the $NO_x$ trap (3), a hydrocarbon injector (4) placed upstream from hydrocarbon treating catalyst (2), a probe (7) for measuring the gas mixture strength.

The hydrocarbon treating catalyst (2) is a partial (or controlled) hydrocarbon oxidation catalyst that cooperates with the $NO_x$ trap (3) for trapping the nitrogen oxides and that allows to obtain, at the outlet thereof, gases with a low oxygen ($O_2$) concentration and with high carbon monoxide (CO) and hydrogen ($H_2$) concentrations.

A control unit is furthermore provided for recording and processing data coming from various detectors and/or stored in order to carry out effective regeneration of the $NO_x$ trap (3) without disrupting the smooth running of the engine.

22 Claims, 4 Drawing Sheets

PROCESS AND DEVICE INTENDED FOR NITROGEN OXIDES ELIMINATION IN AN EXHAUST LINE OF AN INTERNAL-COMBUSTION ENGINE

FIELD OF THE INVENTION

The present invention relates to the field of treatment of gases discharged at the exhaust of lean-burn spark-ignition engines and of diesel engines.

Such engines emit a certain number of pollutants that have to be eliminated, which must be done all the more efficiently as standards are becoming increasingly severe, notably in industrialized countries.

Examples of the most numerous pollutants that have the most harmful effect on the environment are nitrogen oxides.

BACKGROUND OF THE INVENTION

It is well-known to eliminate this type of pollutant by passing the exhaust gases through catalysts (referred to as $DeNO_x$ catalysts) intended for nitrogen oxides conversion. This requires postinjection of reducers such as hydrocarbons for example. The known catalysts being active within a given temperature range, several catalysts having different formulations, i.e. different activity ranges, can be placed in the catalytic muffler. The sphere of action of the catalytic elements is thus extended.

By way of example, the formulations used for low temperatures are of the Platinum/Alumina or Platinum/Zeolite type. The temperatures for which these catalysts are the most active range from 200° C. to 250° C.

Catalysts referred to as "High-temperature" catalysts are generally active between 300° C. and 500° C. These are for example Copper-Zeolite type catalysts.

However, in this context, a problem arises when the exhaust gases are not, in the catalyst(s), within a temperature range for which conversion of the nitrogen oxides is sufficient.

However, the global efficiency of such aftertreatment systems remains limited. By way of example, the efficiency on nitrogen oxides of a Platinum/Alumina catalyst with postinjection of gas oil is commonly below 50%.

There are also catalysts on which the nitrogen oxides are adsorbed in various forms. By way of example, the $NO_x$ can be stored as nitrates or enter an oxide structure. These catalysts are commonly referred to as "$NO_x$ traps".

The "nitrate" type $NO_x$ trap is a catalyst that allows nitrogen oxides to be stored at the surface thereof, in an oxidizing environment. It generally consists of a precious metal deposited on or close to a basic mass which is generally an oxide or a mixture of alkaline oxides, alkaline-earth oxides or rare earths. In lean mixture (excess oxygen), the NO ($NO_x=NO+NO_2$) that is predominantly present in exhaust gases is oxidized by the precious metal, thus forming $NO_2$. This $NO_2$ migrates to the catalyst surface where it is adsorbed on the oxide and forms a nitrate. These nitrates are stable in an oxidizing environment over a very wide temperature range. In order to desorb these nitrates from the surface of the catalyst, a high temperature is required in the oxidizing environment or a reducing mixture has to be made.

Since exclusively thermal regeneration of the $NO_x$ trap does not allow treatment of the nitrogen oxides redischarged at the exhaust, a second catalyst (continuous $DeNO_x$ type for example) is then necessary to reduce them.

Patent application EP-A1-0,540,280 describes thermal regeneration of this type, with a $NO_x$ trap, provided with a gas heating system, followed by a nitrogen oxides reduction catalyst. Both catalysts are mounted on a line bypassing the main exhaust line. According to this document, a valve system allows to decrease the GHSV (ratio of the flow of gas to the volume of catalyst expressing the contact time between the gases and the catalyst) during trap emptying stages. The $NO_x$ conversion coefficient of the nitrogen oxides reduction catalyst is thus improved. However, with this configuration, the part of the gas stream flowing through the main line does not flow through the $NO_x$ reduction catalyst.

Regeneration through gas mixture strength control allows to reduce the desorbed $NO_x$ by three-way type catalysis, by depositing a suitable noble metal on the catalyst (rhodium for example).

With a gasoline engine running with a lean mixture, transition from lean to rich is compatible with its function mode; on the other hand, with a diesel engine, it is more difficult to obtain a mixture strength above 1.

A known implementation consists in injecting hydrocarbons into the exhaust line upstream from the catalyst when the nitrates have to be desorbed from the $NO_x$ trap. U.S. Pat No. 5,201,802 illustrates an embodiment of this type. However, although this method allows to obtain mixture strengths momentarily above 1, the gaseous mixture obtained contains high concentrations of oxygen, which is disadvantageous for regeneration.

Another known process consists in reinjecting exhaust gases at the intake at very high rates and in controlling the mixture strength at the engine intake. Document EP-A1-0,829,623 discloses such a process.

The latter strategy has the drawback of disrupting the smooth running of the engine and of making engine control more complex.

SUMMARY OF THE INVENTION

The present invention comprises regeneration of a $NO_x$ trap essentially based on variation of the mixture strength of the exhaust gases, and which does not disrupt the smooth running of the engine.

Regeneration of a $NO_x$ trap includes here both $NO_x$ emptying and reduction, the latter being carried out by the $NO_x$ trap.

More precisely, the object is to allow regeneration of the $NO_x$ trap by decreasing the oxygen concentration and by increasing the carbon monoxide CO and hydrogen $H_2$ concentrations in the exhaust gases upstream from the $NO_x$ trap. CO and $H_2$ are, by definition, good reducers as they result from partial oxidation of postinjected hydrocarbons. The carbon monoxide acts both on $NO_x$ emptying and reduction.

The object of the present invention thus is a device for eliminating nitrogen oxides in an exhaust line of a lean-burn internal-combustion engine, comprising a means for trapping the nitrogen oxides, a means for regenerating said nitrogen oxides when the trapping means is saturated, a hydrocarbon treating means arranged upstream from the nitrogen oxides trapping means, a hydrocarbon injection means placed upstream from the hydrocarbon treating means, a means for measuring the gas mixture strength.

According to the invention, the hydrocarbon treating means is a partial (or controlled) hydrocarbon oxidation catalyst that cooperates with said nitrogen oxides trapping means that allows to obtain, at the outlet thereof, gases with a low oxygen ($O_2$) concentration and with high carbon monoxide (CO) and hydrogen ($H_2$) concentrations. The device according to the invention further comprises a means for recording and for processing data received from the various detectors and/or stored so as to allow effective regeneration of the NO$_x$ trap without disrupting the smooth running of the engine.

According to an embodiment of the invention, the hydrocarbon injection means, the hydrocarbon treating means and the NO$_x$ trapping means are arranged in this order and in series in relation to the direction of circulation of the gases in the exhaust line.

According to a particular embodiment of the invention, the hydrocarbon injection means, the hydrocarbon treating means and the NO$_x$ trapping means are arranged in the main exhaust line itself.

According to another possibility, the hydrocarbon injection means, the hydrocarbon treating means and the NO$_x$ trapping means are arranged in a line bypassing the main exhaust line, the device according to the invention then comprising a means for modulating the flow of the gases between said bypass line and the main line.

Without departing from the scope of the invention, a hydrocarbon injection means, a hydrocarbon treating means and a nitrogen oxides trapping means can thus be arranged both in the bypass line and in the main line, with a means for modulating the flow of the gases between said bypass line and the main line.

Furthermore, the device according to the invention can comprise at least one temperature detector that can be placed upstream from said hydrocarbon treating means.

The device according to the invention can also comprise a means for measuring the amount of NO$_x$ trapped in the trapping means, downstream from the latter.

Furthermore, a second temperature detector can be placed in the exhaust line, downstream from the hydrocarbon treating means.

In particular, the means for measuring the exhaust gas mixture strength can be placed downstream from the NO$_x$ trapping means.

Without departing from the scope of the invention, the means for measuring the exhaust gas mixture strength can be placed between the hydrocarbon treating means and the NO$_x$ trapping means.

Furthermore, the exhaust line can comprise a gas preheating means placed upstream from the hydrocarbon treating means.

The present invention also relates to a process for eliminating nitrogen oxides in an exhaust line of a lean-burn internal-combustion engine, characterized in that it consists in:

trapping the NO$_x$ in a suitable means,
injecting hydrocarbons into the exhaust line according to various engine running parameters and to the state of saturation of a NO$_x$ trapping means,
partly oxidizing the hydrocarbons in a specific means so as to obtain a maximum amount of CO and H$_2$,
regenerating said NO$_x$ trapping means by means of the hydrocarbon oxidation products, notably CO and H$_2$.

According to an aspect of the invention, the amount of NO$_x$ stored in the NO$_x$ trapping means is monitored.

According to another aspect of the invention, the temperature of the gases upstream and/or downstream from the hydrocarbon treating means is monitored.

Furthermore, the gas mixture strength upstream and/or downstream from the NO$_x$ trapping means is monitored.

Said additional hydrocarbons are advantageously injected when the NO$_x$ trapping means is saturated, the temperature (T1) of the exhaust gases is above a threshold value (T$_R$) for which the hydrocarbon treating means is active, so that the exhaust gas mixture strength ($\lambda$) is greater than or equal to a given mixture strength ($\lambda_R$) that triggers regeneration of the trapping means.

More precisely, said hydrocarbons are injected for a length of time (d$_R$) that is shorter than a predetermined stored time (d$_{RMAX}$).

According to an advantageous aspect of the invention, the exhaust gas flow is modulated between a main line and a line that bypasses said main line.

The exhaust gases are thus furthermore heated prior to being partly oxidized in said bypass line.

In particular, regeneration is stopped according to the information provided by a detector such as a mixture strength probe placed downstream from the NO$_x$ trapping means.

BRIEF DESCRIPTION OF THE DRAWINGS

Other advantages, features and details of the invention will be clear from reading the description hereafter, given by way of non limitative example, with reference to the accompanying drawings wherein.

DETAILED DESCRIPTION OF THE INVENTION

Figure 1:
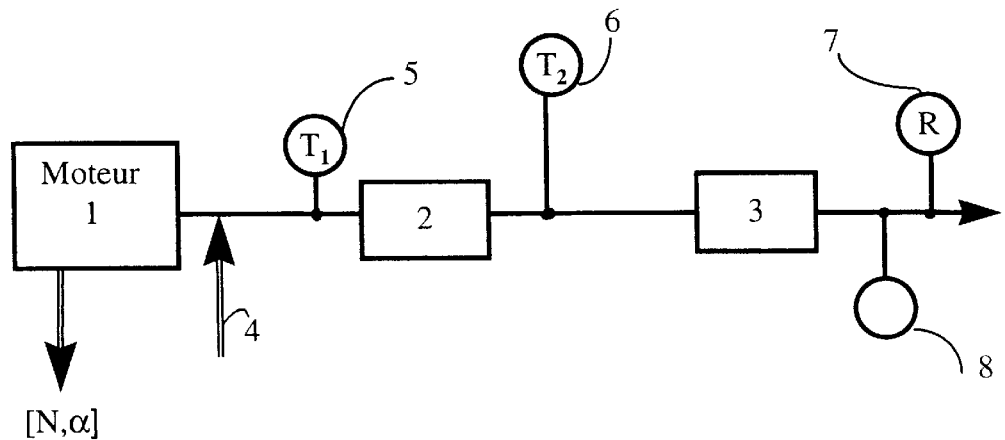
FIG. 1 is a diagram of an exhaust line according to an embodiment of the invention.

According to the embodiment of the invention illustrated in FIG. 1, the exhaust line of engine 1 essentially comprises: a first catalyst 2 hereafter referred to as controlled oxidation catalyst, intended for partial oxidation of hydrocarbons to carbon monoxide (CO) and hydrogen (H$_2$).

A second catalyst 3 is placed in the main exhaust line downstream from first catalyst 2 in relation to the direction of propagation of the gases in the exhaust line. This second catalyst 3 is a "NO$_x$ trap" whose regeneration mode (emptying and reduction) is based on the gas mixture strength.

Furthermore, a hydrocarbon injection means 4 is provided for postinjection. Means 4 is placed upstream from catalysts 2, 3. This postinjection can be performed by the injection system of the engine, if this is possible: a common-rail type injection system, well-known to specialists, can thus perform such a postinjection at the exhaust. A specific injection system, secondary to injection in the engine itself, can also be provided without departing from the scope of the invention.

Furthermore, at least one temperature detector can be necessary for implementing the invention.

In the embodiment of FIG. 1, two temperature detectors 5, 6 are provided: one, 5, upstream from controlled oxidation catalyst 2, and the second, 6, between catalyst 2 and NO$_x$ trap 3.

Detector 5 allows to know if the temperature of the gases is sufficient to oxidize the hydrocarbons injected during the regeneration phase of $NO_x$ trap 3.

Temperature detector 6 gives the temperature at which the $NO_x$ are stored under lean mixture conditions and it allows, during regeneration, to know the temperature variation due to hydrocarbon postinjection.

A $NO_x$ detector 8 intended to evaluate the amount of $NO_x$ stored, at a given time, in $NO_x$ trap 3 can be arranged downstream from $NO_x$ trap 3.

Finally, a mixture strength probe 7 can be placed between the first and the second catalyst; this mixture strength probe 7 is preferably situated downstream from $NO_x$ trap 3.

An exhaust line whose structure has been described above globally works as follows:

When the engine runs under lean mixture conditions, catalyst or $NO_x$ trap 3 stores all or part of the $NO_x$ discharged by engine 1. The fraction of $NO_x$ stored on the catalyst at the time t depends both on the state of saturation of $NO_x$ trap 3 (i.e. what it has been able to store until time t) and on the temperature, flow rate, $NO_x$ concentration, exhaust gas mixture strength conditions. The amount of $NO_x$ stored on the catalyst can be estimated either from data from engine maps and from a mathematical model, or possibly by means of $NO_x$ detector 8 placed downstream from $NO_x$ trap 3. When the amount of $NO_x$ stored on catalyst 3 reaches a threshold value S, the regeneration procedure is activated. The amount of hydrocarbons to be postinjected in order to momentarily obtain a mixture strength above 1 in the exhaust line is determined according to the parameters obtained from the engine maps, such as the exhaust gas mixture strength and flow rate. Proportional mixture strength probe 7 placed for example downstream from controlled oxidation catalyst 2 can be used therefore in order to control the postinjection amount. Furthermore, temperature detector 5 placed upstream from first catalyst 2 indicates if the temperature of the gases that reach controlled oxidation catalyst 2 is sufficient and thus if postinjection has to be activated. Controlled oxidation catalyst 2 then consumes the oxygen contained in the exhaust gases, thus forming notably carbon monoxide (CO) and hydrogen ($H_2$), two elements that favour regeneration of $NO_x$ trap 3.

Figure 2:
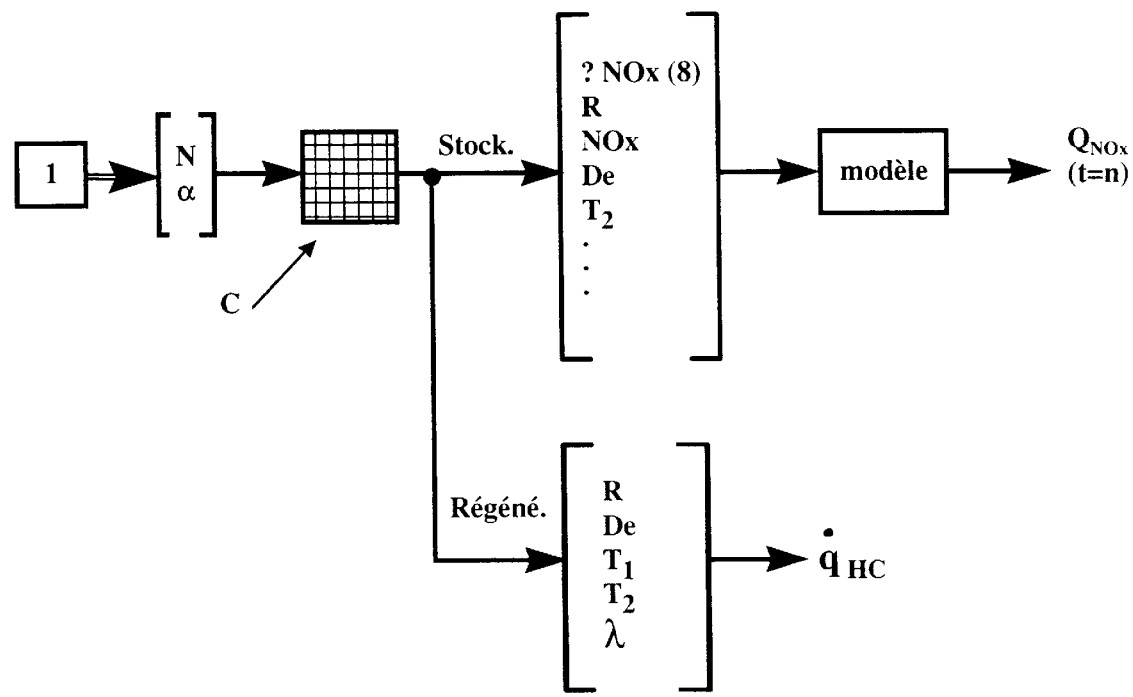
FIG. 2 is an organization chart of the data required for the process according to the invention.

FIG. 2 is a summary of the parameters used according to the invention. It can be seen that engine 1 supplies two types of data: the engine speed (N) and the position of the accelerator pedal ($\alpha$). From these data, a map C stored for example in an electronic control unit allows to determine other parameters such as the mixture strength R at the engine outlet, the $NO_x$ ratio at the engine outlet and the flow rate at the exhaust.

Other data, measured by temperature detector(s) 5, 6 or $NO_x$ detector 8 allow to determine, during the $NO_x$ storage phase, the amount of $NO_x$ stored (Q $NO_x$) at a given time (t=n) if they are associated with the first data.

A mathematical model is used instead of or in addition to $NO_x$ detector 8 to determine the $NO_x$ concentration in the gases.

If a detector 8 is used in addition to the mathematical model it is then possible to permanently adjust the parameters of the model so as to follow the real behaviour of the catalysts in the exhaust line. Aging of the catalysts can thus be taken into account for example.

In the regeneration phase, map C provides the same data as in the storage phase which, associated with the temperature and mixture strength measurements, allow to determine the flow rate of hydrocarbons to be injected at the exhaust.

Figure 3:
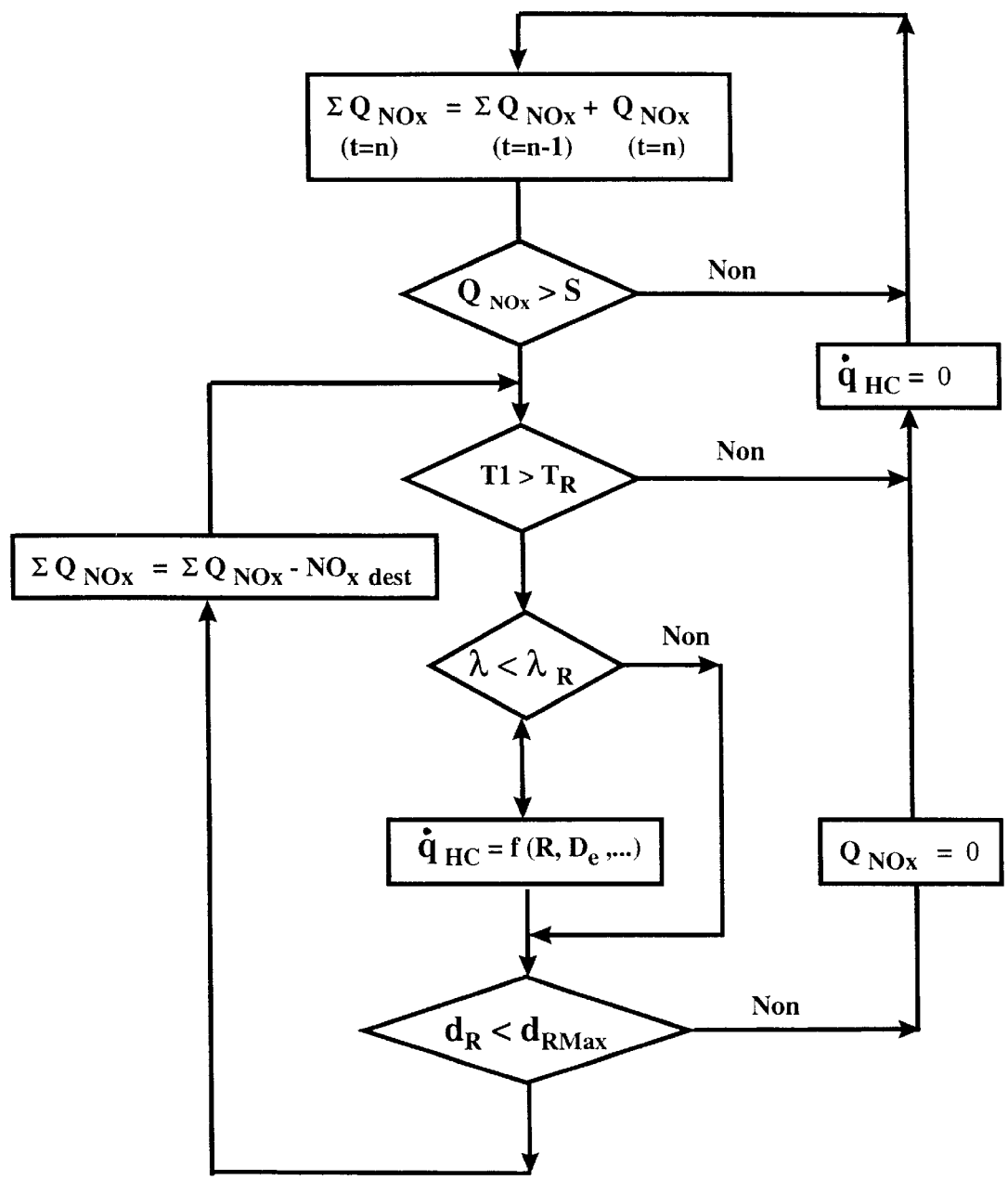
FIG. 3 is a flowchart relative to a regeneration process for a NO$_x$ trap according to the first embodiment of the invention.

FIG. 3 is a flowchart of the various stages leading, or not, to regeneration of $NO_x$ trap 3.

The amount of $NO_x$ (Q $NO_x$) stored in the $NO_x$ trap is permanently monitored. If this value reaches a certain threshold S stored in an electronic control unit, the temperature $T_1$ of the gases upstream from first catalyst 2 is checked; if this temperature is higher than a threshold $T_R$ that corresponds to the minimum temperature for which first catalyst 2 is active, the mixture strength $\lambda$ of the gases downstream from first catalyst 2 is checked.

The amount of postinjected hydrocarbons is linked with the difference between the mixture strength R of the gases at the engine outlet and the threshold strength $\lambda_R$ required for regeneration.

At the end of the regeneration procedure, hydrocarbon injection is stopped, then the $NO_x$ storage procedure is started again.

Figure 4:
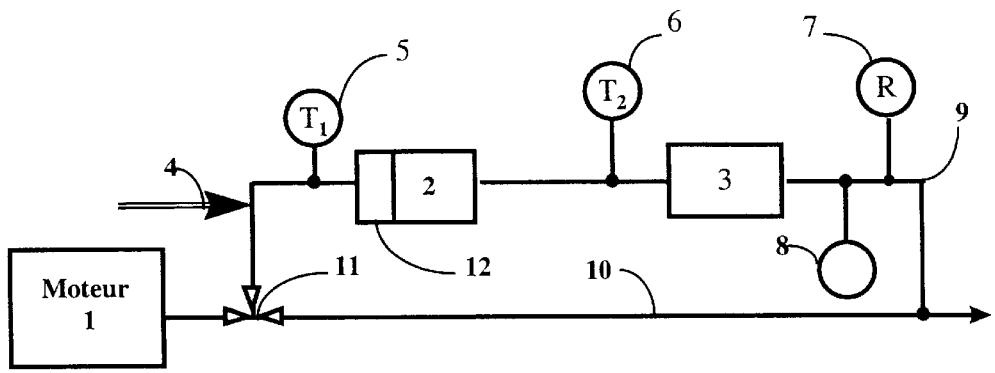
FIG. 4 is a diagram of an exhaust line according to a second embodiment of the invention.
Figure 5:
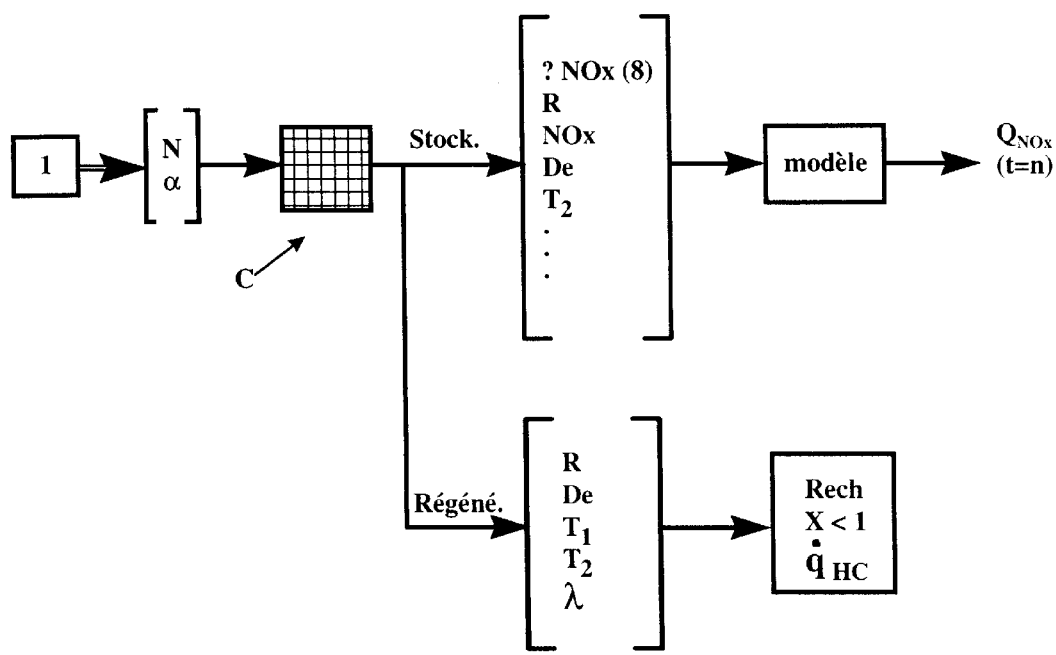
FIG. 5 is an organization chart of the data according to the second embodiment of the invention.
Figure 6:
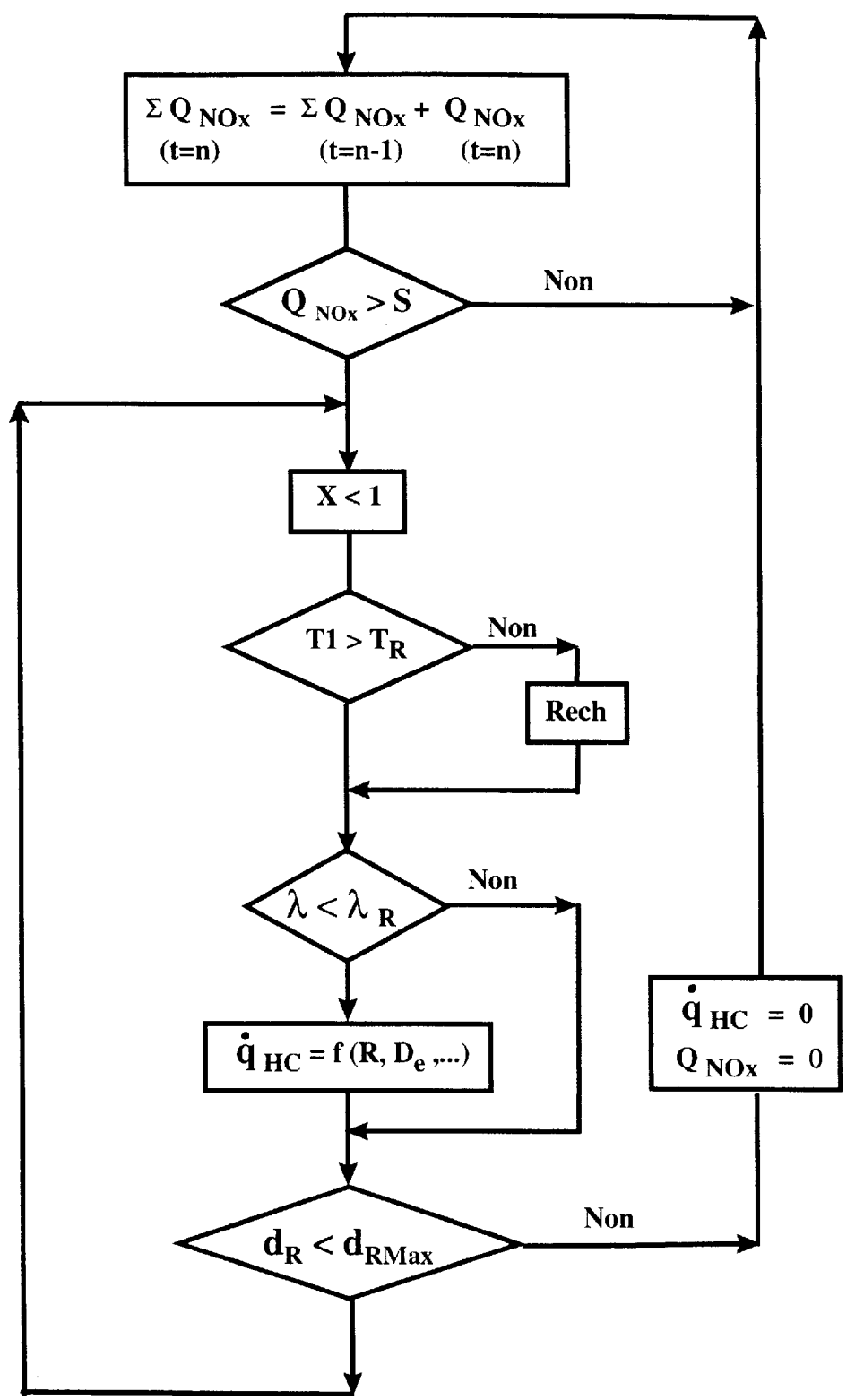
FIG. 6 is a flowchart relative to the regeneration process for a NO$_x$ trap according to the second embodiment of the invention.

FIG. 4 relates to a second embodiment of the invention that differs from the first one in that injection means 4, catalysts 2, 3 and the various temperature 5, 6, mixture strength 7 or $NO_x$ 8 detectors are no longer arranged in main exhaust line 10, but in a bypass line 9. A valve or any other means intended to modulate the main flow of the exhaust gases coming from engine 1 is placed at the source of bypass line 9.

This configuration allows, in comparison with the first one, to limit the flow of gases passing through the catalysts during regeneration of the trap. The amount of hydrocarbons to be postinjected in order to reach a mixture strength above 1 is thus decreased.

During the stage of $NO_x$ storage on the $NO_x$ trap, all of the exhaust gases flow through the line comprising the catalysts. Hydrocarbon postinjection is not activated.

Estimation of the amount of $NO_x$ stored on the catalyst is similar to that described above. When the regeneration phase is activated, part of the gases is bypassed thanks to the valve means. The flow passing through the catalysts is thus limited, which allows to decrease the GHSV (Gas Hourly Space Velocity=Flow of gas/Catalyst volume). The amount of postinjected hydrocarbons depends on the exhaust gas mixture strength (provided by the engine data maps) and on the bypassed flow fraction. The fraction of flow X in bypass line 9 depends on the total gas flow and on the position of valve 11 at the head of bypass line 9. As before, a proportional mixture strength probe placed downstream from the controlled oxidation catalyst or from $NO_x$ trap 3 can be used to control the amount of postinjected hydrocarbons.

According to yet another embodiment of the invention, the exhaust line can also comprise an exhaust gas heating means 12 placed, according to FIG. 4, in bypass line 9, just upstream from controlled oxidation catalyst 2.

The working principle of this embodiment of the invention is globally the same as that described above.

The advantages of the third embodiment of the invention can be summarized as follows:

As mentioned before, hydrocarbon postinjection and therefore $NO_x$ trap 3 regeneration depend on the temperature level of the gases passing through catalysts 2 and 3. Thus, if this level is insufficient, regeneration of trap 3 cannot be activated, to the detriment of the global efficiency of the system. It may therefore be interesting to associate with the previous sytem a device 12 allowing to heat the gases in order to raise the temperature level during regenerations when it is too low. Temperature detectors 5, 6 respectively placed upstream and downstream from controlled oxidation catalyst 2 allow the gas heating system to be managed. Bypass line 9 is interesting on two accounts: it allows to decrease the amount of hydrocarbons to be postinjected in order to reach a mixture strength above 1 and it allows to limit the energy to be consumed for heating the gas fraction flowing through catalyst 2.

In general, the interest of the invention is to consume, during regeneration of the $NO_x$ trap, the oxygen contained in the exhaust gases by the hydrocarbons postinjected on controlled oxidation catalyst 2, and to form carbon monoxide CO and hydrogen $H_2$ upstream from $NO_x$ trap 3. A mixture with a strength above 1, poor in oxygen and rich in CO and $H_2$ is thus obtained upstream from $NO_x$ trap 3 during hydrocarbon postinjection, which favours both nitrates desorption and reduction of the desorbed $NO_x$ on means (3). A notable improvement in the $NO_x$ trap regeneration phase is thus obtained.

What is claimed is:

1. A device for elimination of nitrogen oxides in an exhaust line of a lean-burn internal-combustion engine, comprising a nitrogen oxides ($NO_x$) trap for trapping nitrogen oxides, a hydrocarbon treating catalyst placed upstream from the nitrogen oxides trap, a hydrocarbon injector placed upstream from the hydrocarbon treating catalyst, a means for measuring the exhaust gas mixture strength, characterized in that said hydrocarbon injector is placed on the exhaust line and in that hydrocarbon catalyst is a partial (or controlled) oxidation catalyst for the hydrocarbons injection, allowing to obtain, at the outlet thereof, gases with a low oxygen ($O_2$) concentration and high carbon monoxide (CO) and hydrogen ($H_2$) concentrations, further comprising a means to record and to process data coming from various detectors or stored so as to control the hydrocarbon injector to perform effective regeneration of the $NO_x$ trap without disrupting the smooth running of the engine.

2. A device as claimed in claim 1, characterized in that the hydrocarbon injector, the hydrocarbon treating catalyst and the $NO_x$ trap are placed in the exhaust line in this order and in series in relation to the direction of circulation of the gases.

3. A device as claimed in claim 2, characterized in that the hydrocarbon injector, the hydrocarbon treating catalyst and the $NO_x$ trap are placed in the main exhaust line.

4. A device as claimed in claim 1, characterized in that the hydrocarbon injection means (4), the hydrocarbon treating means (2) and the $NO_x$ trapping means (3) are placed in a line (9) bypassing the main exhaust line, and in that it further comprises a means (11) for modulating the flow of gas between said bypass line (9) and the main line (10).

5. A device as claimed in claim 1, characterized in that it further comprises at least one temperature detector.

6. A device as claimed in claim 5, characterized in that said temperature detector is placed upstream from said hydrocarbon treating catalyst.

7. A device as claimed in claim 1, characterized in that it comprises a means for measuring the amount of $NO_x$ trapped in the $No_x$ trap, placed downstream from the $NO_x$ trap.

8. A device as claimed in claim 6, characterized in that it comprises a second temperature detector placed downstream from said hydrocarbon treating catalyst.

9. A device as claimed in claim 7, characterized in that the means for measuring the exhaust gas mixture strength is placed downstream from the $NO_x$ trap.

10. A device as claimed in claim 7, characterized in that means (7) for measuring the exhaust gas mixture strength is placed between hydrocarbon treating means (2) and $NO_x$ trapping means (3).

11. A device as claimed in claim 10, characterized in that the means for measuring the exhaust gas mixture strength is placed upstream from second temperature detector.

12. A device as claimed in claim 1, characterized in that it further comprises a gas heating means placed upstream from the hydrocarbon treating catalyst.

13. A process intended for elimination of nitrogen oxides in an exhaust line of a lean-burn internal-combustion engine, comprising:

trapping the $NO_x$ in an $NO_x$ trap, injecting hydrocarbons into the exhaust line according to various running parameters of the engine and to the state of saturation of said $NO_x$ trap, partly oxidizing the hydrocarbons in a hydrocarbon oxidation unit, regenerating said $NO_x$ trap by the oxidation products of the hydrocarbons injected.

14. A process as claimed in claim 13, characterized in that the amount of $NO_x$ stored in the $N_x$ trap is monitored.

15. A process as claimed in claim 14, characterized in that the temperature of the gases upstream and/or downstream from the hydrocarbon oxidation unit is monitored.

16. A process as claimed in claim 15, characterized in that the exhaust gas mixture strength upstream and/or downstream from the $NO_x$ trap is monitored.

17. A process as claimed in claim 16, characterized in that additional hydrocarbons are injected when the $NO_x$ trap is saturated, the temperature (T1) of the exhaust gases is higher than a threshold value ($T_R$) for which hydrocarbon oxidation unit is active, so that the exhaust gas mixture strength ($\lambda_R$) that triggers regeneration of the $NO_x$ trap.

18. A process as claimed in claim 13, characterized in that said hydrocarbons are injected for a length of time ($d_R$) that is shorter than a predetermined stored time ($d_{RMAX}$).

19. A process as claimed in claim 13, characterized in that the flow of exhaust gases is modulated between a main line and a line bypassing said main line.

20. A process as claimed in claim 19, characterized in that the exhaust gases are heated prior to being partly oxidized in said bypass line.

21. A process as claimed in claim 13, characterized in that regeneration is stopped according to information provided by a detector placed downstream from the $NO_x$ trap.

22. A device as claimed in claim 1, characterized in that the means intended to record and to process data coming from various detectors or stored so as to control the hydrocarbon injector to perform effective regeneration of the $NO_x$ trap without disrupting the smooth running of the engine comprises an electronic control unit.

* * * * *